United States Patent [19]

Müllenberg

[11] 4,268,185
[45] May 19, 1981

[54] MOUNTING ATTACHMENT

[76] Inventor: Ralph Müllenberg, Im Wiesengrund 6, 4048 Grevenbroich, Fed. Rep. of Germany

[21] Appl. No.: 930,872

[22] Filed: Aug. 3, 1978

[30] Foreign Application Priority Data

Aug. 2, 1977 [DE] Fed. Rep. of Germany ..... 27347848

[51] Int. Cl.² .............................................. F16D 1/06
[52] U.S. Cl. ...................................... 403/16; 403/370
[58] Field of Search ............... 403/370, 371, 248, 249, 403/250, 277, 16

[56] References Cited

U.S. PATENT DOCUMENTS

| | | | |
|---|---|---|---|
| 3,501,183 | 3/1970 | Stratienko | 403/370 |
| 3,776,651 | 12/1973 | Peter et al. | 403/248 |
| 3,782,841 | 1/1974 | Winckelhaus | 403/370 X |
| 3,847,493 | 11/1974 | Peter | 403/370 |
| 3,847,495 | 11/1974 | Peter | 403/370 |
| 3,990,804 | 11/1976 | Peter | 403/370 |
| 3,998,563 | 12/1976 | Kloren | 403/370 |

*Primary Examiner*—Andrew V. Kundrat
*Attorney, Agent, or Firm*—Schwartz, Jeffery, Schwaab, Mack, Blumenthal & Koch

[57] ABSTRACT

Clamping assemblies are disclosed for clamping together two members which fit concentrically one within the other, such as a hub and shaft arrangement. In one type of construction there is an inner taper ring, an intermediate taper ring and an outer taper ring each having one or more taper surfaces. Altogether, there are at least two pairs of interacting taper surfaces. The taper angle of one of the pairs of surfaces is within a range of angles in which self-locking takes place while the taper angle of the other of the pairs of taper surfaces is greater than the angle at which self-locking takes place. A plurality of axially oriented clamping bolts axially clamp the intermediate taper ring against the inner and outer taper rings, and the vertexes of both taper angles of the intermediate taper ring are both located on the same side of the intermediate taper ring. Also, the clamping bolts grip that one of the taper rings having the taper angle located within the self-locking range. In another type of clamping assembly there is an inner member, such as a shaft end, with an end face and a coaxial recess in the end face in which recess a taper clamping arrangement is provided for clamping an outer member to the inner member. The coaxial recess in the inner member is of cylindric shape, and the taper clamping arrangement includes at least an outer, double taper ring having a pair of inner surfaces formed as oppositely directed taper surfaces with the greatest wall thickness in the center of this outer ring. There is also a pair of inner taper elements each with an outer taper surface cooperating with one of the inner surfaces of the outer taper ring.

17 Claims, 11 Drawing Figures

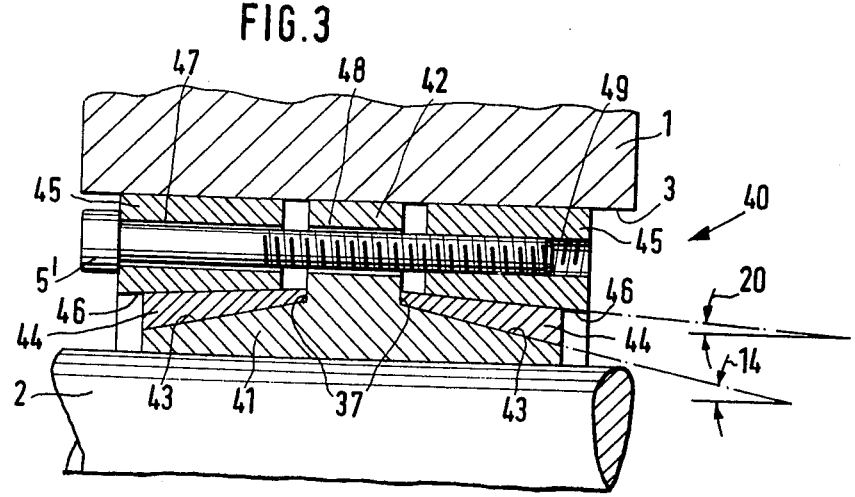
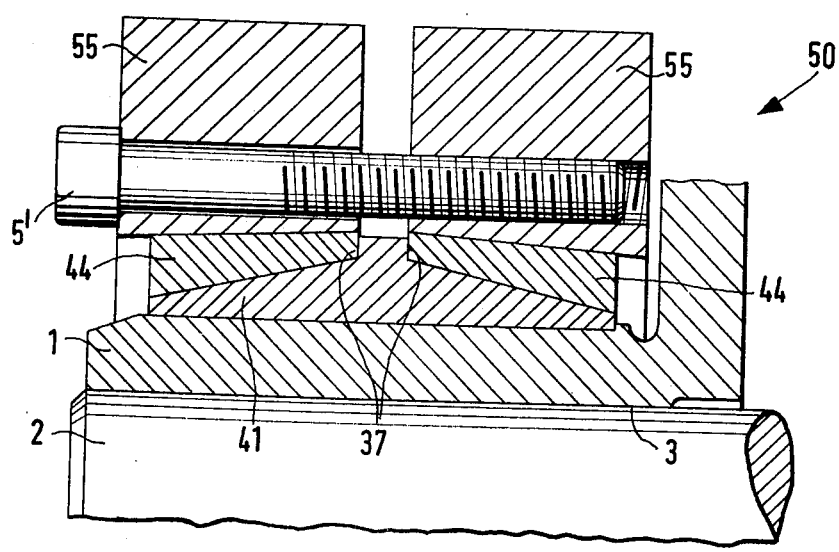

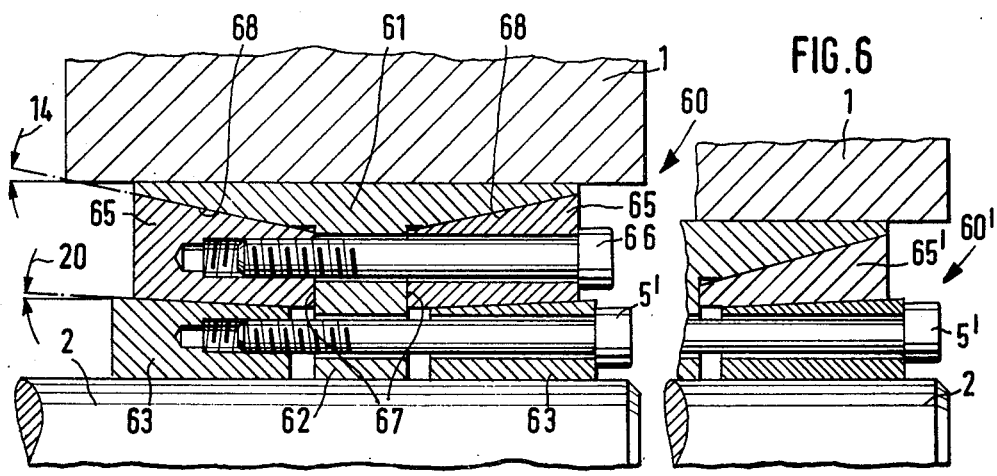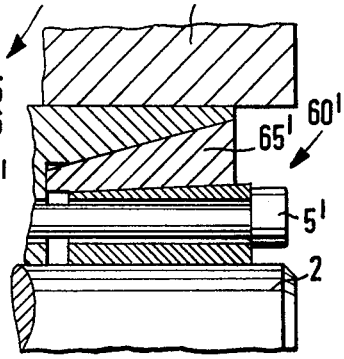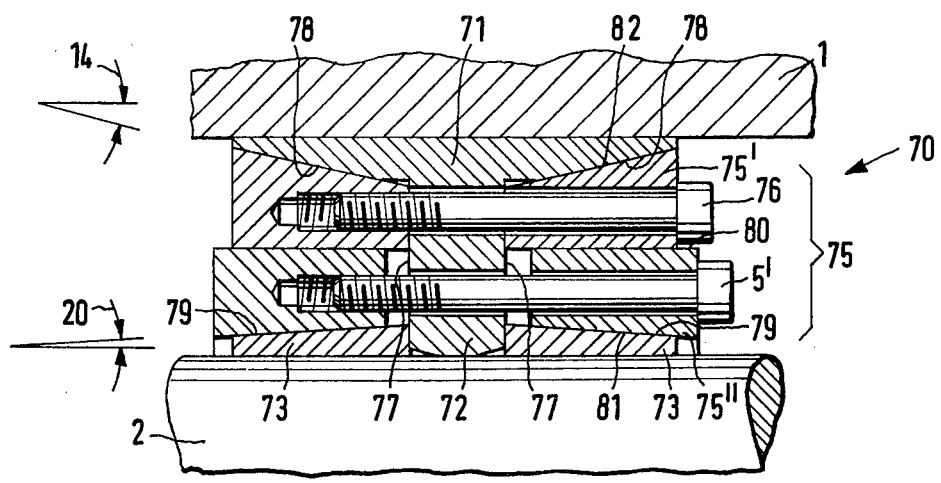

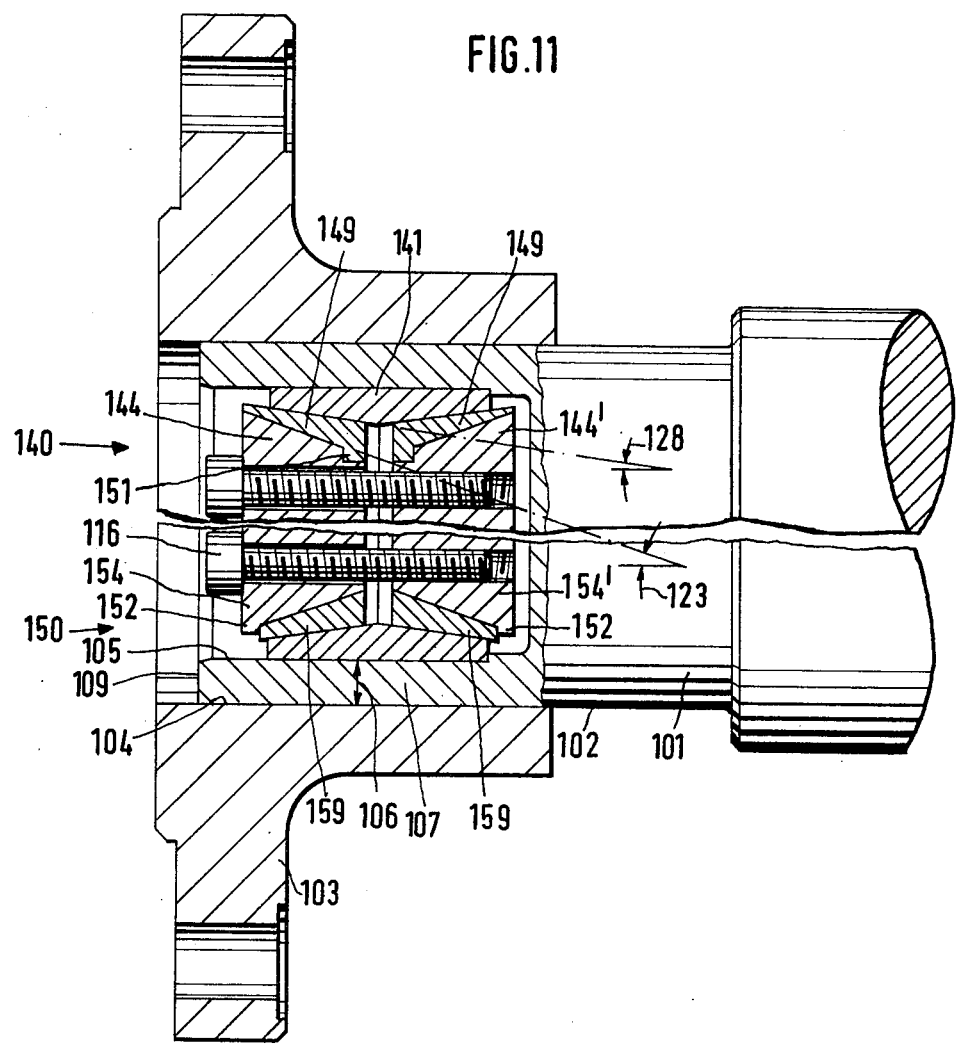

MOUNTING ATTACHMENT

This invention relates to a mounting attachment comprising a clamping assembly with concentric taper rings that are mutually tightened in axial direction by axially oriented clamping bolts and are thus forced to produce a clamping effect by the radial expansion to which their taper surfaces are subjected.

A clamping assembly from DT-GM No. 75 12 290 in which there are different taper angles, the purpose of which is to achieve a self-releasing clamping assembly requiring no lifting screw (i.e. a screw for separating the mating elements) after the clamping bolts have been slackened in spite of the existence of a taper angle located in the self-locking region that in itself makes possible the transfer of particularly high peripheral forces. This is brought about by the simultaneous existence of a taper angle exceeding the self-locking region. This fact permits a further increase of the transmittable peripheral forces because all the space available on the circumference can be utilized for clamping bolts.

In DT-GM No. 75 12 290, however, the clamping bolts attack the intermediate taper ring i.e., they act thereon. In order to achieve the desired radial clamping, the intermediate taper ring has to be shifted in axial direction by a certain amount. This axial relocation is produced by the clamping bolts. The resistance to this relocation at the taper surface with the larger taper angle outside the self-locking angle is greater than at the taper surface with the taper angle within the self-locking region because the contact-force component in the axial direction is greater at this taper surface. This surplus of the axial component is lost for the generation of a radial clamping force. When the clamping bolts are tightened to their load limit, the intermediate taper ring stops at a certain point and cannot be further shifted although the axial component is less at the taper surface with the lower taper angle which in itself would permit further shifting of the intermediate taper ring. Thus, the intermediate taper ring cannot be displaced to the extent that would be desirable to achieve a maximum radial clamping force. The objective of the present invention is to form a clamping assembly of the initially mentioned type in such a way that the radial clamping force is increased for the same loading of the clamping bolts.

In a first embodiment under this invention this problem is solved by the vertexes of the taper surfaces of the intermediate taper ring being located on the same side of the taper ring and by the clamping screws acting upon that one of the other taper rings which features the taper angle contained within the self-locking region.

In this way, the desired clamping effect does not require any displacement of the intermediate taper ring in relation of that other taper ring which has the larger taper angle. The clamping bolts act only upon the taper ring having its taper angle within the self-locking region, and this ring can be displaced in relation to the intermediate taper ring until the lower axial component the taper surfaces having the smaller taper angle has exhausted the force of the clamping bolts. In this process, the intermediate taper ring can remain stationary in relation to the other taper ring, thus avoiding the disadvantages of the taper surface with the larger taper angle during the clamping. Nevertheless the taper surface having a taper angle exceeding the self-locking region, will develop its advantages when the clamping bolts are slackened by ensuring the loosening of the clamping assembly.

In another embodiment the present invention is characterized by the facts that the vertexes of the taper surfaces of the intermediate taper ring are located on different sides of the intermediate taper ring; that the intermediate taper ring is split along a cylindrical surface coaxial to its axis; and that the clamping bolts act upon that half of the intermediate taper ring which has the taper angle located within the self-locking region.

Because the intermediate taper ring is split, its half bearing the taper surface with the larger angle may remain stationary in relation to its associated taper ring when the clamping bolts are tightened; on the other hand, the other half of the intermediate taper ring can be displaced as much as permitted by the axial component on the taper surface having its taper angle within the self-locking region.

The principle common to both solutions is to let the clamping bolts grip or attack so that the taper surfaces having taper angles outside the self-locking region, are not displaced in relation to one another. both embodiments of the clamping assembly according to this invention can be formed so that an axial stop is provided on the other taper ring having the taper angle exceeding the self-locking region, this axial stop being provided for the thin-walled face end of the intermediate taper ring or that half of it having the larger taper angle and so that the radii of the taper surfaces with the larger taper angle are so dimensioned that, at one point during the tightening of the clamping bolts, the intermediate taper ring contacts both the taper surface having its angle exceeding the self-locking region and, with its face end, the said stop. Hence, when the tightening of the clamping bolts has started, the intermediate taper ring will somewhat slip out onto the taper surfaces having the larger taper angle and join, as soon as its face end has contacted the stop, the other taper ring to form an in itself immovable unit. From this point of time onwards, the effect of the clamping bolts will only result in a displacement of the taper surface having its taper angle within the self-locking region.

In a first construction the clamping assemblies according to this invention can be shaped so that the other taper ring featuring the larger taper angle is made up of a single ring and the clamping bolts act between this ring and the other taper ring having the smaller taper angle.

However, it is also possible to provide a double version of the other taper ring with the larger taper angle, two intermediate and two other rings with the smaller taper angle so that the clamping screws act between the other taper rings having the smaller taper angle.

This "double version" means that the taper ring in question features two taper surfaces following one another in the axial direction and having their vertexes located on the outer side of the taper surface involved.

This invention also relates to an embodiment where an outer member, seated on a shaft, is clamped to the shaft by a clamping assembly accomodated in a recess in the shaft end.

A mounting arrangement of the type just described is known from FR-PS No. 1 361 776 where a tapered recess is provided coaxially in the shaft end into which a mating tapered plug can be inserted and driven into the recess by a concentric screw. This causes the shaft end to be radially expanded and thus clamped to an outer member seated on the shaft end.

In this case, only one screw is provided for clamping and the same screw has to develop the force required to expand the shaft end; hence, there is only a limited share of force for the actual clamping of the outer member and this known embodiment is therefore useful only for the transmission of small torques. Another disadvantage is that the recess in the shaft end has to have a tapered shape, which involves considerable machining effort as the mating surfaces of the recess and the plug have to be highly accurate for large-area contact and removal of the plug from the recess without binding.

An objective of this invention is to provide a clamping assembly of the type just described which, however, permits the transmission of large torques at moderate cost and effort.

The solution of this problem under the present invention consists in providing a shaft-end recess that is of cylindrical shape and providing a clamping assembly comprising at least one outer taper ring with a cylindrical peripheral surface and a tapered inner peripheral surface as well as an internal taper element with a tapered outer surface interacting with the inner peripheral surface of the outer taper ring.

Since the shape of the recess is cylindric, its machining cost and effort is reduced. The shaft with the recess and the clamping assembly can be manufactured at different places without encountering any mating problem. In addition, a cylindric surface is manufactured with greater ease; for the case in hand, it does not even have to be of any special machining standard because there is no motion along the recess periphery.

A clamping assembly of the type here disclosed is not confined to only one screw; rather, it has a plurality of clamping bolts distributed over the periphery and axially clamping the outer taper ring to the inner taper ring. In this way, very high clamping forces can be provided.

Taper surface clamping assemblies of the type here employed have been known before. Thus DE-OS No. 23 29 940 shows such inner and outer clamping assemblies. However, in the case of inner clamping, the clamping assembly is provided between shaft and hub and the torque is transferred from shaft to hub and vice versa through the clamping assembly. In the case of outer clamping, the outer member has a hub surrounded by a clamping assembly under tensile load, just as also disclosed in DE-PS No. 1 294 751. Here there is the advantage that the actual clamping assembly is not partaking in the transmission of the torque that directly goes from shaft to hub or vice versa through their contact surfaces. However, this calls for considerable effort inasmuch as the outer member has to be equipped with a compressible hub and the clamping assembly seated on the hub exterior has to have a considerable size and considerable weight.

The present invention has the advantage of the torque being directly transferred from one member to the other one and the clamping assembly not partaking in the transfer of the torque, but this is achieved with a fraction of the weight of the clamping assembly and without any design limitation concerning the shape of the outer member. The clamping assembly can attack under a particularly suitable point of the outer member, for instance, its center or in a range of high resistivity. There is no need for a hub attached to one side of the outer member.

In a first embodiment under this invention, the outer taper ring has an inner taper surface directly mating the outer taper surface of the taper element.

This is the simplest embodiment. The taper angle may be within or without the self-locking range. In the former case, lifting screws have to be provided in addition to the clamping bolts for disassembly of the clamping assembly.

In a second embodiment, an intermediate taper ring is provided between the outer taper ring and the taper element which intermediate taper ring has an outer taper surface contacting the inner taper surface of the outer taper ring and which has an inner taper surface contacting the outer taper surface of the taper element, the vertexes of its taper surfaces being located on the same side of the clamping assembly and one of the taper angles being within the self-locking range, the other one above this range with at least the same angular separation.

With the intermediate taper ring provided, the assembly can be formed so that clamping of the taper ring will result in the generation of those high clamping forces as controlled by the taper angle located within the self-locking region. On the other hand, however, the clamping assembly is self-slackening, which is brought about by the other taper angle located above the self-locking range.

For the highest possible efficiency in transforming the clamping force into a radial force, the outer taper ring is made a double ring with tapers in opposite directions and greatest wall thickness in the center; two taper elements and possibly two intermediate taper rings are provided; and the clamping bolts are made to act between the taper elements or taper rings.

In the single embodiment, the clamping force and the reaction force thus generated attack one taper surface only. In the double embodiment, two taper surfaces are loaded under otherwise identical conditions, virtually resulting in a doubled clamping effect.

The taper elements can be formed as solid taper disks or taper rings with accordingly reinforced walls.

The last-mentioned embodiment allows of an important variety of the invention characterized by a cylindric pin provided within the recess of the inner member, the taper ring being seated on this pin through its cylindric inner surface.

The clamping assembly then operates as one of the usual varieties, e.g. under DE-OS No. 23 29 940 with inner clamping, but with the difference that it is not a shaft and a hub that are clamped together; rather, the shaft in the form of the pin and the hub in the form of the outer part of the shaft end surrounding the recess form one piece. The objective is not to provide a torque-stable joint, but to expand the shaft end in radial direction in order to tighten its contact to the proper hub.

An essential advantage of the last-mentioned embodiment is that bending moments can be diverted to the pin. The wall of the shaft-end recess can be made relatively thin to achieve an efficient expansion and clamping of the recess wall to the outer member because this wall is partly unburdened from the bending moments that are diverted through the clamping assembly to the pin.

Even in the embodiment where a recess in the face of the shaft end is expanded by a clamping assembly in order to clamp the shaft to an outer member seated on the shaft, axial stops can be provided in the clamping assembly so that the intermediate taper rings abut against such stops during the clamping process so that no more displacement at the taper surfaces with the larger taper angle will take place during the continued tightening of the clamping bolts.

From the point of time of this abutting, then, any axial displacement of the various taper rings will take place only at the taper surfaces with the smaller taper angle; as a result, the generated high clamping forces can be exploited without any loss of the bolt clamping force.

The drawing illustrates embodiments of the invention.

FIG. 3 and 4 show sections through two double embodiments, only the upper half of the clamping assembly being illustrated;

FIG. 5 and 6 show views of other examples corresponding to the embodiments of FIG. 3 and 4;

FIG. 7 illustrates an example of the other embodiment;

FIG. 8 through 11 show sections through shaft ends to which outer members are attached with the aid of a clamping assembly seated in shaft-end recesses.

In all these examples, the outer member is designated by 1. This outer member may be the hub of a gear or other wheel, the wall of a conveyer-belt driving drum or the like. The outer member 1 is clamped to a shaft 2 by one of the clamping assembly embodiments. The outer member 1 has a cylindric recess 3 and the shaft 2 has a cylindric peripheral surface 4. The space between them, shown in FIG. 1–3 and 5–7, is used to accomodate the clamping assembly; in FIG. 4 the shaft 2 directly contacts the recess 3.

Figure 1:
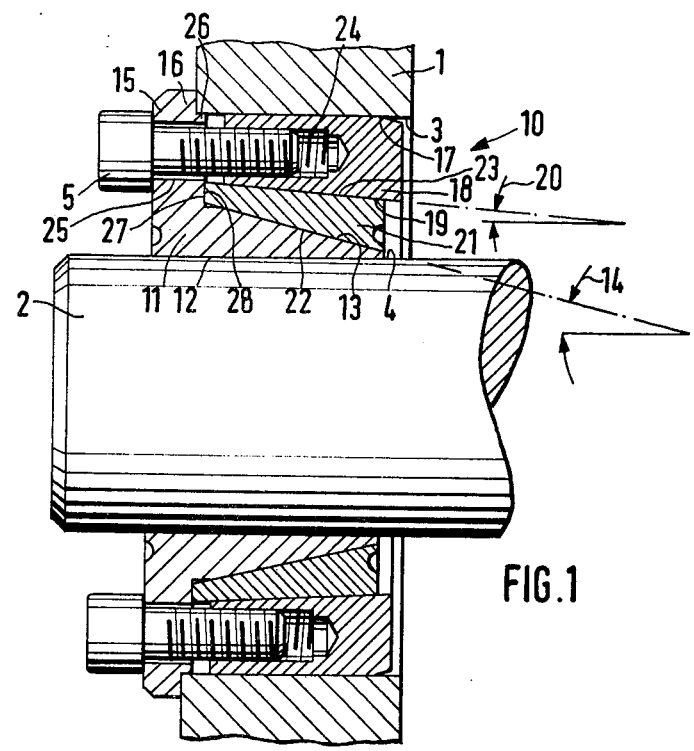
FIG. 1 and 2 show sections through two embodiments constituting single variants.

The whole clamping assembly 10 in FIG. 1 comprises an inner taper ring 11 whose cylindric inner surface 12 contacts the peripheral surface 4 of the shaft 2. On its outside, the ring 11 has a taper surface 13 with a taper angle 14 of about 12°, i.e. above the self-locking angle of about 7° by a particular angular amount, i.e. by about 5°. Of course, the self-locking angle would then be about 7° at the thick-walled end, the taper ring 11 has a radial flange 15 reaching over the edge of the outer member 1 at 16.

Contacting the cylindric recess 3 of the outer member 1 is the cylindric outer peripheral surface 17 of an outer taper ring 18, the inner peripheral surface 19 of which is a taper surface with a taper angle 20 of about 3° that is within the self-locking range. As mentioned, the self-locking angle here is about 7° and therefore angle 20 is less than the self-locking angle by a certain angular amount of about 4°. It will be readily apparent then that the aforementioned particular angular amount of 5° by which angle 14 is greater than the self-locking angle is itself greater than the aforementioned certain angular amount of 4° by which angle 20 is less than the self-locking angle. The taper rings 11 and 18 enclose an intermediate taper ring 21 having on both sides the taper surfaces 22 and 23 that correspond to the taper surfaces 13 and 19, respectively. The taper surfaces 12, 22 and 19, 23 are provided so that the vertixes of the taper surfaces are located on the same and right-hand side of the clamping assembly 10 in FIG. 1.

On the side facing the radial flange 15, the taper ring 18 has a threaded hole 24 in which a cap screw 5 can be screwed from the outside of radial flange 15 through its bore 25.

As long as the screw 5 is loose, the clamping assembly 10 forms a unit with captive parts. After insertion into the space between shaft 2 and outer member 1 the clamping process starts by tightening the clamping bolts 5 that are closely spaced around the circumference of taper ring 18. To achieve centering it may be expedient to provide the radial flange 15 with a cylindric shoulder 26 fitting into the cylindric recess 3. This prevents "sagging" of the outer member 1 on the shaft 2.

When the clamping bolts 5 are tightened, taper ring 18 will axially move towards radial flange 15, dragging along the intermediate taper ring 21. With its surface facing the taper rings 18, 21 and provided perpendicularly to the axis, the radial flange 15 forms a stop 27 where the face 28 of the intermediate taper ring 21 abutts after some displacement. The radii of the taper surfaces 13, 22 are dimensioned so that these taper surfaces are likewise in contact. From this point of clamping onwards, the taper rings 11 and 21 form a unit, the parts of which are mutually immovable when the clamping bolts 5 are further tightened.

Since the clamping bolts 5 are effective between the taper rings 11 and 18, further clamping takes place as if there is only a two-part clamping assembly with a taper angle 20 located within the self-locking range. The taper ring 18 can thus be pulled onto the intermediate taper ring 21 up to achieving a substantial radial contact pressure.

To slacken the clamping assembly, only the clamping bolts 5 have to be backed off. As the taper angle 14 is above the self-locking range, the taper rings 21 and 18 will come loose immediately, not requiring any lifting screw. The force of the clamping assembly 10 is thus increased twice in spite of the possible automatic slackening: first, only the self-locking taper angle 20 providing a substantial radial force share is active during the clamping; second, no space is lost for lifting screws and the whole circumference can be occupied by clamping bolts.

It is recommended to slot all taper rings so that the clamping force of the clamping bolts 5 is not consumed by the taper rings 11, 18, 21. This is also true of the other embodiments except the outer taper rings in FIG. 4.

Figure 2:
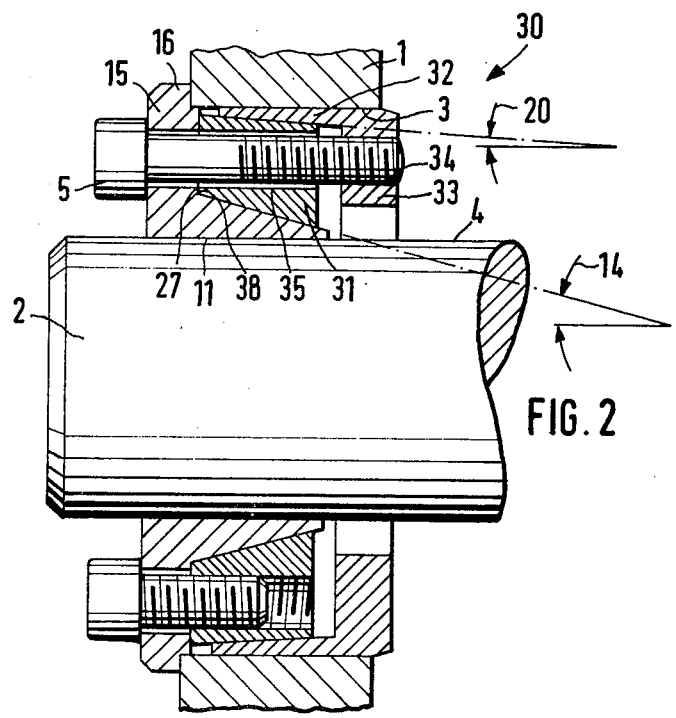

While the intermediate taper ring 21 is rather thin-walled and the taper ring 18 relatively thick-walled in the embodiment of FIG. 1, so that the clamping bolts 5 could be directly screwed-in into ring 18, the intermediate taper ring 31 is thick-walled and the outer taper ring 32 is thin-walled for the clamping assembly of FIG. 2. On the side opposite to the radial flange 15, the outer taper ring 32 has an inward-pointing radial flange 33 that has threaded holes 34 for the clamping bolts 5. Contrariwise, the intermediate taper ring 31 has through holes 35 at these points.

The function of the clamping assembly 30 is, however, similar to that of the assembly 10. The intermediate taper ring 31 is not directly affected by the clamping bolts 5. When the latter are tightened, the taper ring 32 will initially drag along the intermediate taper ring 31 until the latter's face 38 abuts against the stop 27 formed by the facing side of the radial flange 15 of the taper ring 11 with the larger taper angle 14. From then onwards, a displacement will only occur between the outside of the intermediate taper ring 31, featuring the smaller taper angle 20, and the taper ring 32 having the same taper angle 20.

When the clamping bolts 5 are tightened, the outer taper rings 18 and 32 in the embodiments of FIG. 1 and 2 wil of course be displaced also in relation to the recess 3 of the outer member 1. However, this does not result in a displacement of the outer member 1 relative to the shaft 2 because the radial flange 15 overlaps the outer member 1 at the point 16.

FIGS. 3–7 illustrate double clamping assemblies, each comprising two axially lined-up single clamping assemblies inverted only in respect of the taper surfaces, where the outer or inner taper rings are single pieces.

FIG. 3 shows a clamping assembly 40 in double design that essentially corresponds to the clamping assembly 10. The inner taper ring 41 has in its center a web 42 abutting against the inner periphery 3 of the recess of the outer member 1 and resulting in its being centered in relation to shaft 2. The inner taper ring 41 has the taper surfaces 43 decreasing towards the periphery on both sides and having a taper angle 14 exceeding the self-locking range. Seated on the taper surfaces 43 on both sides of the web 42 are intermediate taper rings 44 contacting the taper surface 43 on the inside and having taper surfaces with taper angles 20 within the self-locking range on the outside. There are two outer taper rings 45, the inner taper surfaces 46 of which interact with the outer taper surfaces of the intermediate taper ring 44 and the outer cylindric surfaces of which contact the recess 3. The clamping bolts 5' reach through holes 47 in the outer taper rings 45 on the left in FIG. 4 and holes 48 in the web 42 engaging with the threaded holes 49 of the outer taper rings 45 on the right-hand side in FIG. 3. The side areas of web 42 perpendicular to the axis form axial stops 37 for the intermediate taper rings 44.

When the clamping bolts 5' are tightened, the outer taper rings 45 are drawn axially toward one another and not axially the inner taper ring 41. By way of contrast, note that in FIG. 1 the outer taper ring is drawn axially against the inner taper ring 11. Otherwise the clamping and unclamping process of FIG. 3 corresponds to that of FIG. 1.

The double clamping assembly 50 in FIG. 4 is not inserted into a recess 3 of an outer member 1, but clamps the outer member in the form of a hub externally to shaft 2. The clamping assembly 50 essentially corresponds to the clamping assembly 40 except that the outer taper rings 55 are radially substantially more thick-walled as compared with the taper rings 45 of FIG. 3 because they have to take up the peripheral forces generated by the clamping and are not slotted.

The clamping assembly 60 of FIG. 5 differs from that of FIG. 3 in that the taper ring 61 having the web 62 is the outer taper ring, web 62 extends inwardly to the shaft 2, and centers the outer member 1 on the shaft 2. The intermediate taper rings 65 have taper surfaces with the larger taper angle contacting the taper surfaces 68 of the double taper ring. The inner taper rings 63 feature the smaller taper angle 20 and their outer cylindric surfaces contact the shaft 2.

In the embodiment exemplified in FIG. 5, the intermediate taper rings 65 are joined by the tensioning screws 66. The purpose of the tensioning screws 66 is to pre-tension the intermediate taper rings 65 first until their inner faces abutt against the stops 67 on both sides of web 62 so that the intermediate taper rings 65 and the outer taper ring 61 form a unit. The tensioning screws 66 have nothing to do with the clamping process that is exclusively performed by the clamping bolts 5' pulling towards each other the inner taper rings 63 having the smaller taper angle 20.

The embodiment 60' of FIG. 6 corresponds to 60 of FIG. 5 except that the intermediate taper rings 65' have relatively thin walls and there are no tensioning screws 66.

FIG. 7 illustrates a clamping assembly 70 where the intermediate taper ring 75 is split in two halves 75' and 75" along a cylindric surface 80 coaxial to the axis and the vertexes of the taper surfaces 82, 81 of the halves 75' and 75", respectively, are located on different sides of the taper ring 75. The outer taper ring 71 corresponds to the taper ring 61 and contacts with its web 72 the shaft 2 so that the outer member 1 is centered on shaft 2. Its taper surfaces 78 have the larger taper angle 14.

The taper surfaces 79 of the inner taper rings 73 have the smaller taper angle 20. The outer halves 75' of the intermediate taper ring 75 with the larger taper angle 14 have their faces brought into contact with web 72 by the tensioning screws 76 in this embodiment. The side areas of web 72, perpendicular to the axis, form axial stops 77 for both the outer half 75' of taper ring 75 with the larger taper angle 14 and the inner taper rings 73 with the smaller taper angle 20. Then the clamping assembly 70 is clamped by tightening of the clamping bolts 5'. In this process, the intermediate taper ring half 75" with the smaller taper angle 20 is displaced in relation to the other half 75' and the inner taper rings 73. Hence, only the smaller taper angle 20 is "active," so here again the corresponding high radial clamping forces are achieved although, in contradistinction to the previously described embodiments, the clamping bolts 5' directly attack the intermediate taper ring 75 or its half 75" released by the slotting along the cylindric surface 80.

When the bolts 5' and screws 76 are slackened, the clamping assembly 70 loosens itself because it is pressed free by the taper surface 78 having a taper angle 14 above the self-locking range.

The 5° separation of the taper angle 14 of 12° from the self-locking angle of about 7° is slightly greater than the 4° separation of the taper angle 20 of 3° from the self-locking angle. This ensures the overcoming of the holding force of the taper area in the self-locking range by the releasing force of the taper surface with the larger angle.

FIGS. 8–11 illustrate an additional group of embodiments featuring clamping assemblies in a cylindric recess of the shaft end.

The shaft end 101 represents the "inner member". It has a face 109 and a cylindric peripheral surface 102 on which an outer member 103 is mounted by its cylindric inner peripheral surface 104 substantially corresponding to the diameter of the shaft end 101.

In these embodiments, the outer member 103 is represented by a simple mounting flange, but it may have any shape and form. It may be an attachment gear, the bottom of a conveyer-belt driving drum, a heavy gearwheel or the like. Of essence is only that the outer member 103 should have an inner peripheral surface 104 mating the shaft end 101 on which it can slide as long as the clamping assembly has not yet been operated.

The outer and inner members are clamped to one another with the aid of a clamping assembly accomodated in a cylindric recess 105 of the shaft end. The thickness 106 of the shaft-end wall 107 is so dimensioned that it can withstand the load and can be expanded by the radial expansion force of the clamping assembly so that it becomes strongly pressed against the inner peripheral surface 104 of the outer member 103 resulting in a friction large enough to constitute a dragging connection between the shaft end 101 and the outer member 103.

Figure 8:
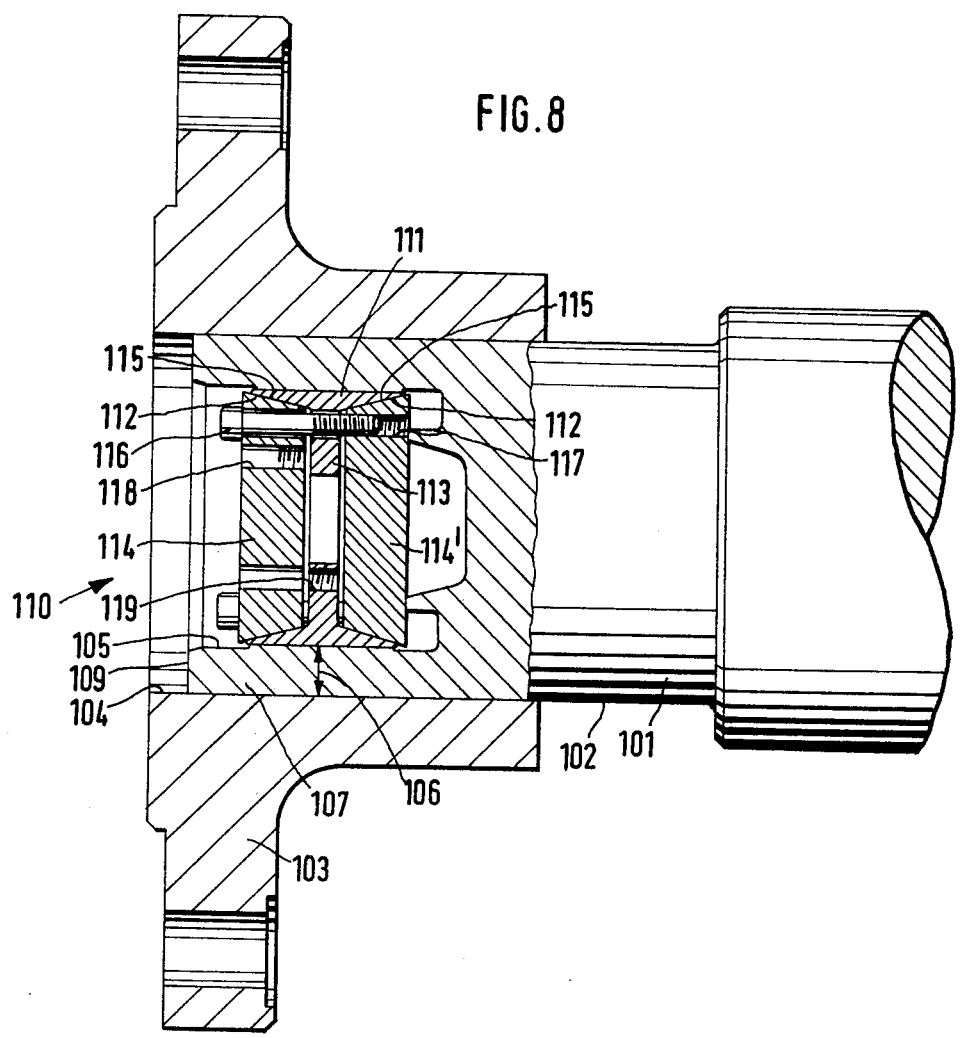

In the recess 105 of the shaft end 101 there is provided a clamping assembly 110 in FIG. 8. This assembly comprises an outer double taper ring 111, the taper surfaces of which feature a self-locking taper angle and which are arranged in opposite relation so that the greatest wall thickness of the double taper ring 111 is inside. In its center, the double taper ring has a partition 113. Provided on both sides of partition 113 are taper disks 114 and 114' having outer taper areas 115, the taper angles of which correspond to those of taper surfaces 112 whith whom they interact. This is accomplished by tightening the clamping bolts 116 reaching through the taper disk 114 in the embodiment exemplified oriented towards the open end of the recess 105 and through the partition 113 to engage with the threaded holes 117 of the taper disk 114'. As a result of the clamping bolts 116 being tightened, the double taper ring 111 is driven apart radially under the wedge effect, in turn expanding the wall 107 of the shaft end 101 that is now pressed against the inner peripheral surface 104 of the outer member 103 which thus becomes clamped to the shaft end.

To release this physical connection, the clamping bolts 116 are slackened. Since the taper surfaces 112, 115 are in the self-locking range, complete demounting would require lifting screws acting against the partition 113 and introduced into the threaded holes 118, 119 to provide an axial force opposite to that provided by clamping bolts 118. These lifting screws are not shown. As will be apparent from the drawing, taper disks 114 and 114' are generally solid. That is, although they include bolt holes 117, 118, they are free of any coaxial bore therethrough.

Figure 9:
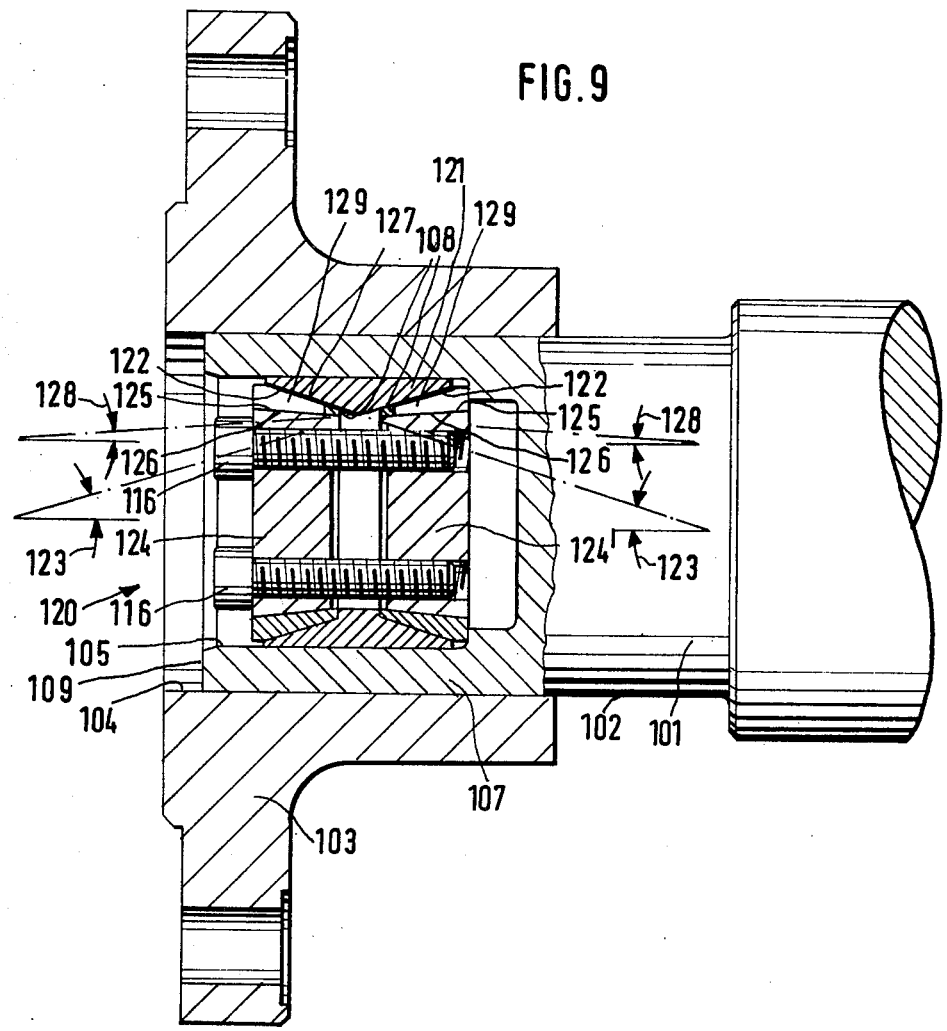

The clamping assembly 120 in FIG. 9 comprises a double taper ring 121 differing from that (111) in FIG. 8 only by the missing partition 113 and by the angle 123 formed by the taper surfaces 122 and the axis being outside the self-locking range.

The taper disks 124, 124' have outer taper surfaces 125 that are within the self-locking range. The angular separation of the taper surfaces 122 from the self-locking angle is at least as large as the angular separation of the taper surfaces 125 from this angle.

Arranged between the taper surfaces 122 and 125 are intermediate taper rings 129 whose outer taper surfaces 127 interact with the taper surfaces 122 and whose inner taper surfaces 126 interact with the taper surfaces 125. The taper surfaces 126, 127 are arranged so that they are inclined in the same orientation for a single taper ring 129 and the vertexes are located on the side facing the other associated taper ring. The vertexes of the taper surfaces 126, 127 of the right-hand taper ring 129 in FIG. 1 are thus to the left from this taper ring while those of the taper surfaces 126, 127 of the left-hand taper ring 129 in FIG. 9 are located to the right of the latter.

When the clamping bolts 116 are tightened, the intermediate taper rings 129 are initially dragged by the taper disks 124, 124' until they contact the inner collar 108 of the double taper ring 121. After that, the taper disks 124, 124' will only slide off in relation to the intermediate taper rings 129 along the taper surfaces 125, 126. Here the flat taper angle 128 located in the self-locking range becomes effective, permitting to produce a substantial radial clamping force.

When the clamping bolts are slackened, the clamping assembly will of itself come free from the taper surfaces 122, 127 having a taper angle outside the self-locking range. Hence, no lifting screws are required.

Figure 10:
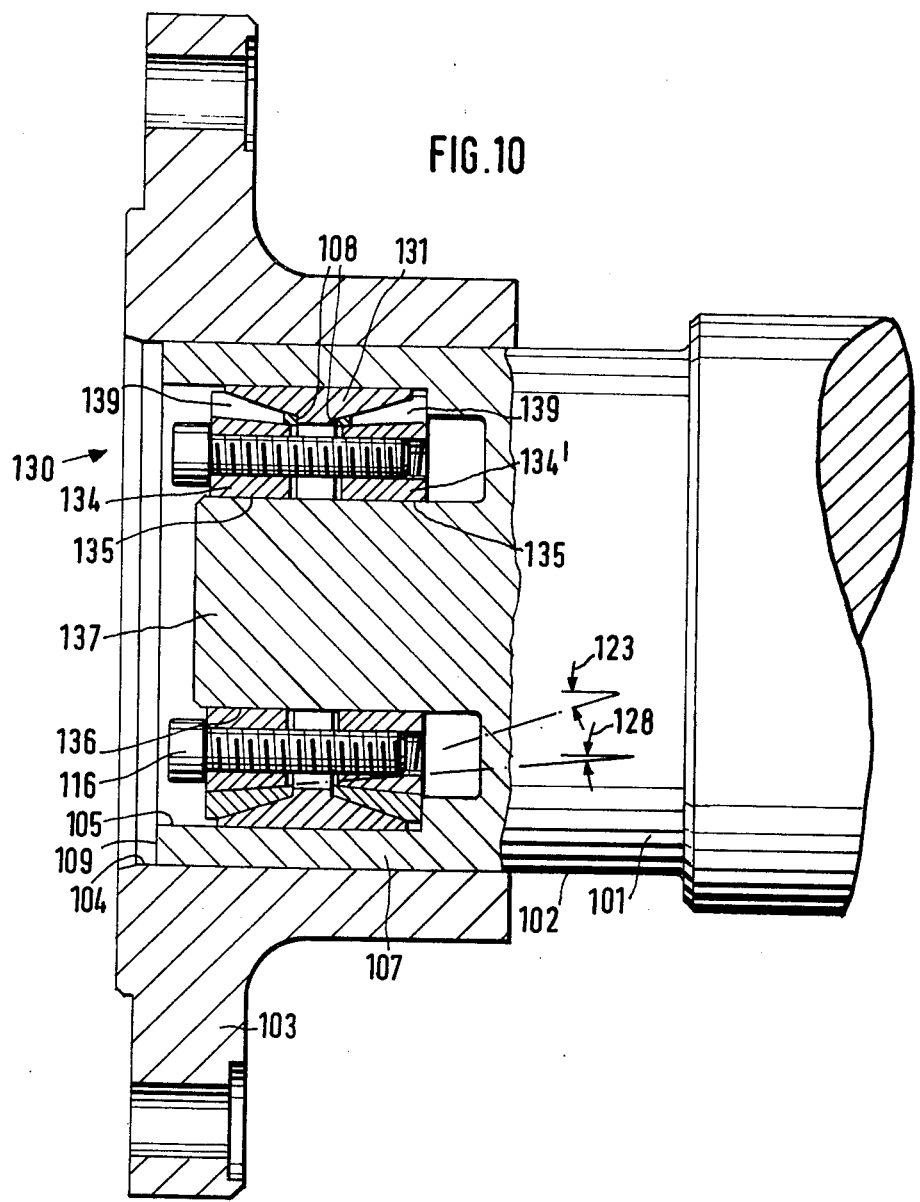

The embodiment of FIG. 10 differs from that in FIG. 9 by the taper rings 134, 134' provided in place of the taper disks 124, 124'. These rings are seated with their cylindric inner peripheral surface 135 on the cylindric outer peripheral surface 136 of a single-piece pin 137 that is coaxial to the recess 105 and protrudes from the recess bottom. This pin is integral with the shaft end 101. The clamping assembly 130 is thus located in an annular space left between the pin 137 protruding into the recess 105 and the recess wall 107. The angular arrangement and dimensioning on the double taper ring 131 and the intermediate taper rings 139 are similar to FIG. 9. The clamping and unclamping performance of the clamping assembly 130 is likewise similar to that of the clamping assembly 120.

The purpose of the embodiment in FIG. 10 is to deflect the bending forces transmitted from the outer member 103 onto the recess wall 107, through the clamping assembly 130 onto the pin 137. Pin 137 thus protects the thin-walled shaft end against the rotational bending stress. Hence, the recess wall 107 can be made particularly thin, thus providing a particularly efficient radial clamping.

The double taper rings 111, 121, 131 and the intermediate taper rings 129, 139 can be slotted to avoid annular stress and to achieve the highest possible efficiency in converting the clamping force of the bolts 116 into a radial clamping force. The slot does not have to extend over the full cross-section; rather, the rings 129, 139 may be without a slot on the sides intended to abut against the collar 108 (FIG. 9 and 10). The recess wall 107 need not be slotted.

FIG. 11 shows two more embodiments 140 and 150 where the stop for the intermediate taper rings is not provided on the double taper ring 141 as in the embodiments of FIGS. 9 and 10 because here the double taper ring 141 has the smaller taper angle 128. The stop serves the purpose of restricting the displacement at the taper surfaces with the larger taper angle 123. In the embodiment 140 of FIG. 11, the intermediate taper rings have radially protruding extensions 151 on the sides facing each other. These extensions 151 engage into corresponding recesses of the inner taper rings 144, 144' and drag these rings when the clamping bolts 116 are tightened. With proper dimensioning, the inner taper rings 144, 144' would not need recesses; rather, the extensions 151 could engage with the inner faces of the inner taper rings 144, 144'.

In embodiment 150 of FIG. 11, the extensions 152 in radial direction are provided on the outsides of the inner taper rings 154, 154' rather than on the intermediate taper rings 159 whom they will drag when the clamping bolts are tightened.

The intermediate taper rings 149 and 159 in embodiments 140 and 150 may be slotted at some point; this is not visible in the drawing where only one half of a taper ring is shown in each case.

I claim:

1. Clamping assembly for physical connection of a cylindric recess of an outer member, especially of a hub, to an inner member, especially a shaft, in coaxial relation to the recess, the inner member having a cylindric outer surface, the assembly comprising: an inner taper ring having a cylindric inner peripheral surface and an outer peripheral surface formed as a taper surface, an outer taper ring having a cylindric outer peripheral surface and an inner peripheral surface formed as a taper surface, and an intermediate taper ring with inner and outer peripheral surfaces formed as taper surfaces interacting with the inner and outer taper surfaces of the other taper rings to provide at least two pairs of interacting taper surfaces, there being a self-locking angle which defines a self-locking range within which self-locking of the taper surfaces takes place, the taper angle of one of said pairs of taper surfaces being less than the self-locking angle by a certain angular amount while the taper angle of the other of said pairs of taper surfaces is greater than the self-locking angle by a particular angular amount, so that, of the inner and outer taper rings, one has a taper surface at an angle within the self-locking range and the other has a taper surface at an angle greater than such range and so that the intermediate taper ring has one taper surface at an angle within the self-locking range and another taper surface at an angle greater than such range, said particular angular amount being greater than said certain angular amount; and axially oriented clamping bolts axially clamping the intermediate taper ring against the inner and outer taper rings, the vertexes of the taper angles of the intermediate taper ring both being located on the same side of the taper ring and the clamping bolts grip that one of the inner and outer taper rings having the taper angle located within the self-locking range.

2. A clamping assembly as defined in claim 1 wherein an axial stop is provided on the other taper ring whose taper angle is greater than and outside of the self-locking range, the taper ring being thinner at one end than at the other and having faces at each end, the axial stop being configured and disposed for engagement with that one face of the intermediate taper ring disposed in the region of the thinner wall thickness; and the radii of said other pair of taper surfaces with the larger taper angle are so dimensioned that, during the tightening of the clamping bolts, the intermediate taper ring both contacts one taper surface of said other pair of taper surfaces with the taper angle greater than the self-locking range and also contacts the stop with its face.

3. A clamping assembly as defined in claim 1 wherein the other taper ring, having the larger taper angle, is formed as a single ring and the clamping bolts extend between and clamp together this and the one taper ring having the smaller taper angle.

4. A clamping assembly as defined in claim 1 wherein the other taper ring having the larger taper angle is formed as a double ring; two intermediate and two of the one taper ring with the smaller taper angle are provided; and the clamping bolts extend between and clamp together the other taper rings with the smaller taper angle.

5. Assembly for physical connection of an inner member that has a cylindric peripheral surface and an end face, in particular a shaft end, with an outer member having a cylindrical recess of the same diameter and seated close to the end face of the inner member, the inner member having a coaxial recess in its end face in which recess a taper clamping arrangement is provided by which the end of the inner member is radially expanded under the effect of tightening clamping bolts wherein the recess is of cylindric shape and the taper clamping arrangement comprises a clamping assembly including at least an outer double taper ring with a cylindric outer peripheral surface and a pair of inner peripheral surfaces formed as oppositely directed taper surfaces with the greatest wall thickness in the center of the outer ring as well as a pair of inner taper elements each with an outer taper surface cooperating with one of the inner peripheral surfaces of the outer taper ring.

6. A clamping assembly as defined in claim 5 wherein each inner taper surface of the outer taper ring is in direct contact with the outer taper surface of one of the taper elements.

7. A clamping assembly as defined in claim 5 wherein a pair of intermediate taper rings are provided between each of the taper surfaces of the outer taper ring and the inner taper elements, said intermediate taper rings each having an outer taper surface in contact with an inner taper surface of the outer taper ring and each having an inner taper surface in contact with an outer taper surface of the taper element so that two sets of taper surfaces are partially defined by each intermediate taper ring, each set of taper surfaces being disposed at a certain taper angle having a vertex, there being a self-locking angle at and below which self-locking of the taper surfaces takes place, the vertexes of the taper angles of the two sets of taper surfaces defined by one intermediate taper ring both being disposed on the same side of the clamping assembly; and one of the taper angles being less than the self-locking angle by a certain angular amount, the other one being larger than and outside of the self-locking angle by a particular angular amount, said particular angular amount being greater than said certain angular amount.

8. A clamping assembly as defined in claim 6 wherein the clamping bolts extend between and clamp together the inner taper elements.

9. A clamping assembly as defined in claim 5 wherein each taper element is provided in the form of a generally solid taper disk which is free of any coaxial bore therethrough.

10. A clamping assembly as defined in claim 5 wherein
each taper element is provided in the form of a taper ring.

11. A clamping assembly as defined in claim 10 wherein
a cylindric pin is provided in the interior of the recess in the inner member and the taper ring cylindric inner surface is seated on this pin.

12. A clamping assembly as defined in claim 7 wherein
axial stops are provided against which the intermediate taper rings abut when the clamping bolts are tightened so that no displacement occurs on the taper surfaces with the greater taper angle when the bolts are further tightened.

13. A clamping assembly as defined in claim 12 wherein
the stop are formed as an inner collar of the double taper ring and the larger taper angle is provided on the double taper ring.

14. A clamping assembly as defined in claim 12 wherein
the stop are formed as an inner collar on the sides of the intermediate taper rings facing each other, and the larger taper angle is provided on the intermediate taper rings.

15. A clamping assembly as defined in claim 12 wherein the stops form outer collars on oppositely facing sides of the intermediate taper rings, and the larger taper angle is provided on the intermediate taper rings.

16. A clamping assembly as defined in claim 1 wherein an axial stop is provided on the intermediate taper ring so as to extend from a taper surface thereof which is one of the taper surfaces of the other pair of taper surfaces.

17. Clamping assembly for physical connection of a cylindric recess of an outer member, especially of a hub, to an inner member, especially a shaft, in coaxial relation to the recess, the inner member having a cylindric outer surface, the assembly comprising: an inner taper ring having a cylindric inner peripheral surface and an outer peripheral surface formed as a taper surface, an outer taper ring having a cylindric outer peripheral surface and an inner peripheral surface formed as a taper surface and an intermediate taper ring with inner and outer peripheral surfaces formed as taper surfaces interacting with the inner and outer taper surfaces of the other taper rings to provide at least two pairs of interacting taper surfaces, said intermediate taper ring being split along a cylindric surface coaxial to its axis to provide two halves, there being a self-locking angle defining a self-locking range within which self-locking of the taper surfaces takes place, the taper angle of one of said pairs of taper surfaces being less than the self-locking angle by a certain angular amount while the taper angle of the other of said pairs of taper surfaces is greater than the self-locking angle by a particular angular amount, so that, of the inner and outer taper rings, one has a taper surface at an angle within the self-locking range and the other has a taper surface at an angle greater than such range and so that the intermediate taper ring has one taper surface at an angle within the self-locking range and another taper surface at an angle greater than such range, said particular angular amount being greater than said certain angular amount; and axially oriented clamping bolts axially clamping the intermediate taper ring against the inner and outer taper rings, the vertexes of the taper angles of the intermediate taper ring being located on different sides of the taper ring and the clamping bolts grip that half of the intermediate taper ring having the taper angle located within the self-locking range.

* * * * *